United States Patent [19]
Sapper

[11] Patent Number: 5,186,482
[45] Date of Patent: Feb. 16, 1993

[54] BICYCLE WITH FOLDING FRAME

[76] Inventor: Richard Sapper, Via Beretta 3, 20121 Milan, Italy

[21] Appl. No.: 676,920

[22] Filed: Mar. 28, 1991

[51] Int. Cl.⁵ .............................................. B62K 15/00
[52] U.S. Cl. .................................... 280/278; 280/287
[58] Field of Search ................ 280/278, 287, 274, 639

[56] References Cited

U.S. PATENT DOCUMENTS

| | | | |
|---|---|---|---|
| 3,990,717 | 11/1976 | Best | 280/278 |
| 4,443,023 | 4/1984 | Ishibashi | 280/278 |
| 4,460,191 | 7/1984 | Ishibashi et al. | 280/639 X |
| 4,844,494 | 7/1989 | Blanchard | 280/278 |
| 4,895,386 | 1/1990 | Hellestam et al. | 280/278 X |

FOREIGN PATENT DOCUMENTS

| | | |
|---|---|---|
| 470322 | 1/1947 | Belgium. |
| 388540 | 9/1990 | European Pat. Off. ............ 280/278 |
| 115840 | 4/1898 | Fed. Rep. of Germany. |
| 1050780 | 12/1966 | United Kingdom. |
| 1376124 | 12/1974 | United Kingdom ................ 280/287 |

Primary Examiner—Margaret A. Focarino
Assistant Examiner—Kevin Hurley
Attorney, Agent, or Firm—Jacobson & Johnson

[57] ABSTRACT

Bicycle with folding frame having a frame defining a lower longitudinal member which rotatably supports a rear wheel and a pedal crank shaft. A saddle upright and a handlebar upright are hinged to the lower longitudinal member, are substantially parallel to one another and are joined by an upper cross-member which is substantially parallel to the lower longitudinal member and is hinged to the uprights to provide an articulated-parallelogram coupling. A steering sleeve is articulated to the handlebar upright, supports a front wheel, and is associated with a handlebar. A locking bar for retaining the frame in operating position is furthermore provided and is arranged diagonally to the articulated parallelogram.

20 Claims, 2 Drawing Sheets

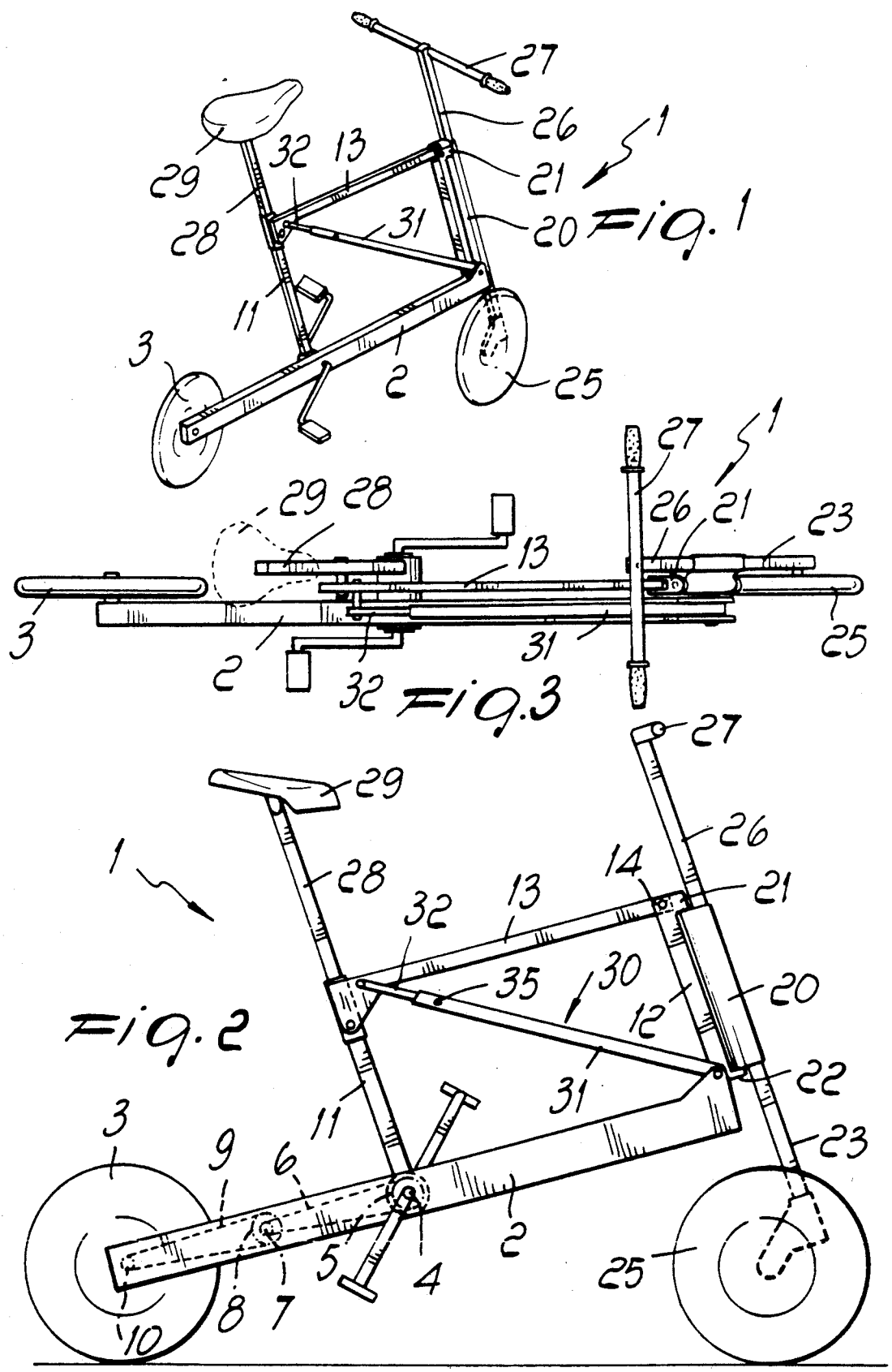

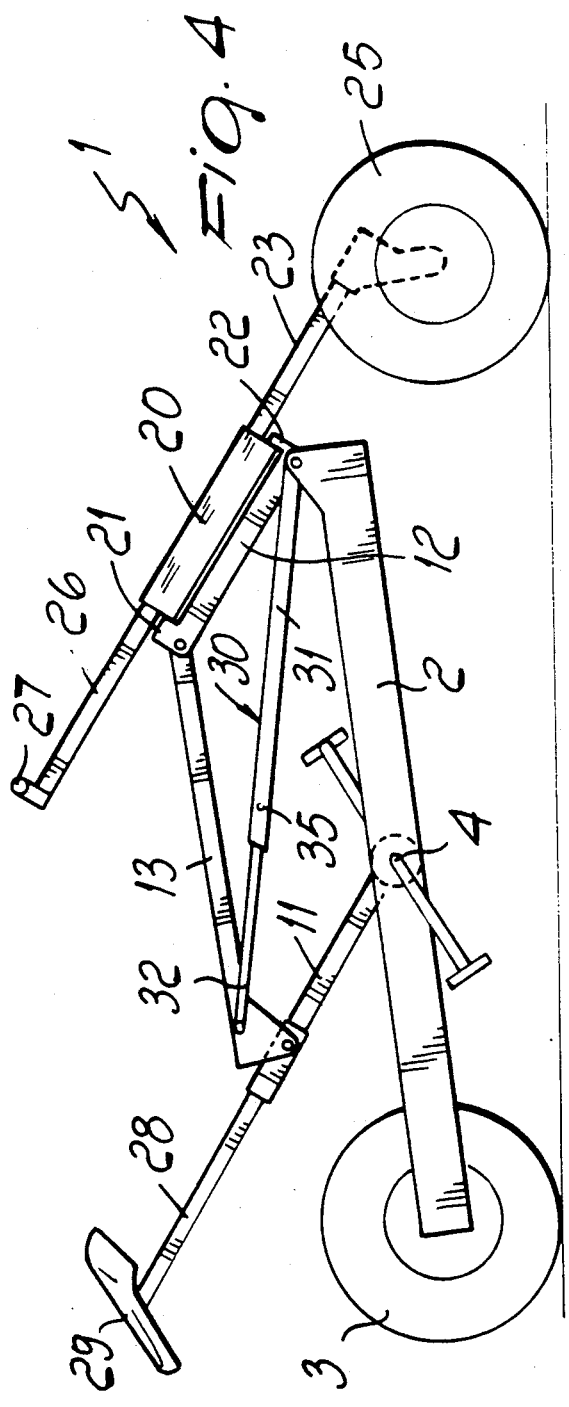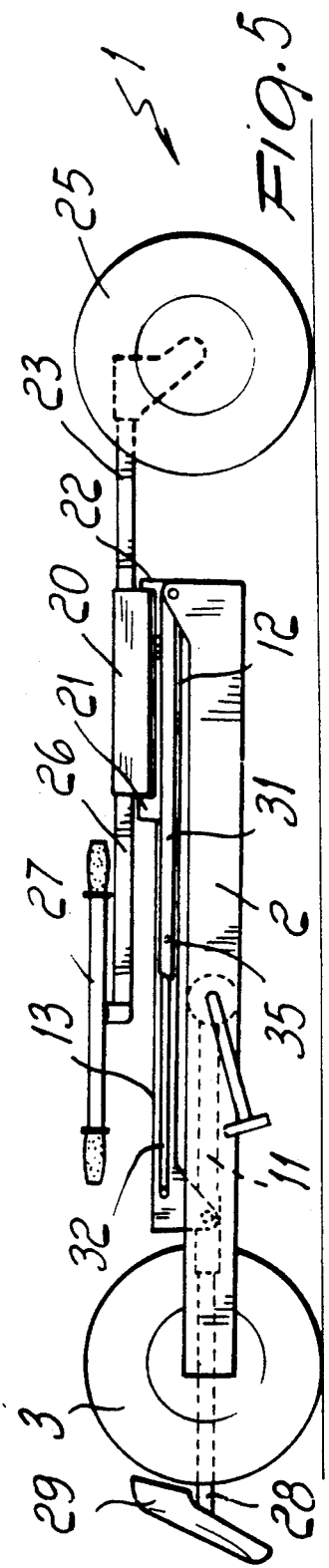

BICYCLE WITH FOLDING FRAME

BACKGROUND OF THE INVENTION

The present invention relates to a bicycle with folding frame particularly for use in city centers.

As is known, so-called folding bicycles are currently commercially available in which particular articulations are provided which allow to reduce the dimensions of the bicycle when not in use.

Currently known folding bicycles generally have a frame which is obtained from tubular elements and has, in a median portion of its longitudinal extension, hinge elements which in practice allow to fold said frame so as to arrange the front wheel to the side of the rear wheel. When the bicycle is in operating conditions, the hinges are conveniently locked so as to have the required mechanical resistance.

Though they are valid from many points of view, said folding bicycles have the problem of having a bulk reduction which facilitates the accommodation of the bicycle in the trunk of motor vehicles or the like but does not allow the manual carrying of the bicycle, since the distribution of the masses does not allow to easily carry said bicycle.

SUMMARY OF THE INVENTION

The aim of the invention is to eliminate the drawbacks described above for known folding bicycles by providing a bicycle with folding frame which, in folded position, has very small dimensions which can be conceptually likened to a pair of skis, so as to make the manual carrying of the bicycle practical and easy, and allows the bicycle to be stored indoors in a very small space.

Within the scope of the above described aim, a particular object of the invention is to provide a bicycle which allows the user to use, for example, public city transportation means, since the bicycle can be easily carried on a bus or on a subway-car, thus allowing the availability of a practical and maneuverable vehicle which reduces travel times in the trips required to reach the public transportation means, thus obtaining an overall reduction in transfer times since, though a bicycle is available, it is possible to use public transportation at least for certain parts of the journey.

Another object of the present invention is to provide a bicycle which despite being of the folding type has gears and a road performance similar to those of a normal bicycle.

Not least object of the present invention is to provide a folding bicycle which can be easily obtained starting from commonly commercially available elements and materials and is furthermore competitive from a merely economical point of view.

This aim, these objects and others which will become apparent hereinafter are achieved by a bicycle with folding frame, particularly for use in city centers, characterized in that it comprises a frame having a lower longitudinal member which rotatably supports the rear wheel and the shaft of the pedal cranks, a saddle upright and a handlebar upright being hinged to said lower longitudinal member, said uprights being substantially mutually parallel and being joined by an upper cross-member which is substantially parallel to said lower longitudinal member and is hinged to said uprights to provide an articulated-parallelogram coupling, a steering sleeve being articulated to said handlebar upright, said sleeve supporting the front wheel and being associated with the handlebar, a locking bar being furthermore provided to retain said frame in operating position and being arranged diagonally to said articulated parallelogram.

BRIEF DESCRIPTION OF THE DRAWINGS

Further characteristics and advantages will become apparent from the description of a preferred but not exclusive embodiment of a bicycle with folding frame, illustrated only by way of non-limitative example in the accompanying drawings, wherein:

FIG. 1 is a perspective view of the bicycle in operating condition;

FIG. 2 is an elevation view of the bicycle according to the invention;

FIG. 3 is a plan view of the bicycle according to the invention;

FIG. 4 is an elevation view of the bicycle according to the invention during the folding step;

FIG. 5 is an elevation view of the bicycle in folded condition.

DESCRIPTION OF THE PREFERRED EMBODIMENTS

With reference to the above drawings, the bicycle according to the invention, generally indicated by the reference numeral 1, comprises a frame constituted by a lower longitudinal member 2 which rotatably supports, at its rear end, a rear wheel 3. The bottom bracket or shaft of the pedal cranks, indicated by 4, is rotatably supported in a median portion of the longitudinal member 2.

Advantageously, the longitudinal member 2 has a box-like configuration so as to internally contain the motion transmission means, which are constituted by a first crown wheel 5 fixed to the bottom bracket 4 and which, by means of a first chain 6, transmits the rotary motion of the bottom bracket 4 to a pinion 7 associated with a second crown wheel 8 which, by means of a second chain 9, transmits the motion to a pinion 10 which is keyed to the rear wheel 3.

In this manner it is possible to increase the transmission ratio, in practice obtaining the same final ratios as a conventional bicycle, though the dimensions are considerably reduced.

A saddle upright, indicated by 11, is hinged to the lower longitudinal member 2 at the coupling axis of the pedal crank shaft 4 and is in practice arranged to the side of the lower longitudinal member.

A handlebar upright, indicated by the reference numeral 12, is hinged at the front end of the lower longitudinal member 2.

The uprights 11 and 12 extend substantially parallel to one another and are mutually joined by an upper cross-member 13 which is hinged to the end of the uprights 11 and 12, is arranged to the side of the upright 11 in the space comprised between said upright 11 and the longitudinal member 2, and is inserted in a fork-like coupling 14 defined above the upright 12.

The uprights 11 and 12, the cross-member 13 and the front portion of the longitudinal member 2 in practice define an articulated parallelogram.

The handlebar upright 12 constitutes a supporting element for a steering sleeve, indicated by 20, which in practice is pivotally articulated to raised portions 21 and 22 which are defined at the ends of the upright 12.

The steering shaft 23 is fixed in the sleeve 20, laterally supports the front steering wheel 25 and is connected, in an upward position, to the handlebar shaft 26 which is associated with the handlebar 27 with the interposition of hinge means which allow the rotation of said handlebar about an axis which is perpendicular to the shaft 26 to arrange said handlebar in alignment with said shaft 26 when not in use.

The saddle upright 11 has a sleeve-like configuration in which the shaft 28 of the saddle 29 is telescopingly insertable in a per se known manner.

A locking bar, generally indicated by the reference numeral 30, is provided in order to lock the frame in the required position and can be arranged diagonally to the articulated parallelogram.

Said locking bar 30 is advantageously constituted by an outer telescoping element 31 which couples to an inner telescoping element 32 with a locking pin 35 for fixing the bar 30 at the required length and consequently to obtain the required locking. The bar 30 is pivotally coupled to a fork which is defined at the front end of the lower longitudinal member 2 and on the pivoting pin of the lower end of the steering upright 12, whereas at the other end it is pivotally articulated to the cross-member 13 proximate to the region of pivoting of the cross-member 13 to the upright 11.

The bar 30 is located above the longitudinal member 2 and to the side of the region affected by the upper cross-member 13.

As is more clearly pointed out in FIG. 3, the different elements which compose the frame are mounted on adjacent parallel planes, thus eliminating the overlapping of the different elements of the frame in a folding step.

As is more clearly pointed out in FIGS. 4 and 5, the folding occurs in a very simple manner: after removing the locking element 35 from the telescoping bar 30, the folding in fact occurs by rotating the saddle upright 11 toward the rear wheel 3.

Once the frame is completely folded, the component elements arrange themselves mutually side by side, consequently obtaining a structure with an elongated shape with a very small bulk which consequently makes carrying extremely easy and simple. As already mentioned previously, the handlebar 27 can furthermore be rotated so as to arrange itself in alignment with its shaft 26.

From what has been described above it can thus be seen that the invention achieves the intended aim and objects and in particular the fact is stressed that a folding bicycle frame is provided which, by exploiting an articulated-parallelogram articulation, can significantly reduce its bulk, when not in use, simply by means of a mutual rotation of the component elements, which can reach a compacted position in which they overlap and arrange themselves mutually side by side, consequently obtaining an assembly which extends predominantly along a single direction.

During the carrying step it is also possible to use the front wheel as ground resting element, consequently avoiding the need to hold weights, which could be troublesome.

The invention thus conceived is susceptible to numerous modifications and variations, all of which are within the scope of the inventive concept.

All the details may furthermore be replaced with other technically equivalent elements.

In practice, the materials employed, so long as compatible with the specific use, as well as the contingent shapes and dimensions, may be any according to the requirements.

We claim:

1. Bicycle with folding frame, particularly for use in city centers, comprising a front wheel, a rear wheel, a handlebar, a pedal crank shaft, and a frame which has a lower longitudinal member which rotatably supports said rear wheel and said pedal crank shaft, a saddle upright and a handlebar upright being hinged to said lower longitudinal member, said uprights being mutually substantially parallel and being joined by an upper cross member which is substantially parallel to said lower longitudinal member and is hinged to said uprights to provide an articulated-parallelogram coupling, a steering sleeve being articulated to said handlebar upright, said sleeve supporting said front wheel and being associated with said handlebar, a locking bar being furthermore provided for retaining said frame in operative position, said locking bar being arranged diagonally to said articulated parallelogram, wherein said locking bar is constituted by an outer telescoping tubular element and by an inner telescoping tubular element which are mutually slidable, locking means being furthermore provided for locking said bar at a required useful length.

2. Bicycle with folding frame, according to claim 1 wherein said handlebar upright is arranged in a plane and, wherein said saddle upright is arranged beside said longitudinal member and beside said cross-member in said plane, said locking bar being superimposed on said lower longitudinal member.

3. Bicycle with folding frame, according to claim 1, wherein said lower longitudinal member has a box-like configuration which contains a motion transmission assembly, said motion transmission assembly transmitting the motion from said pedal crank shaft to said real wheel.

4. Bicycle with folding frame, according to claim 3, wherein said motion transmission assembly has a first crown wheel keyed on said pedal crank shaft, said first crown wheel meshing with a first chain, said first chain engaging a first pinion, said first pinion being rigidly rotationally associated with a second crown wheel, said second crown wheel engaging a second chain, said second chain being entrained around a second pinion, said second pinion being rigidly associated with the hub of said rear wheel.

5. Bicycle with folding frame, according to claim 1, wherein said steering sleeve is rotatably supported by a pair of raised portions, said pair of raised portions being defined at the end of said handlebar upright.

6. Bicycle with folding frame, according to claim 5, wherein said steering sleeve is coupled to a handlebar shaft, said handlebar being connected to said handlebar shaft and rotatable about an axis which is perpendicular to said handlebar shaft, whereby to arrange said handlebar in a position which is parallel to said handlebar shaft when the bicycle is folded.

7. Bicycle with folding frame comprising;
an articulated parallelogram having a longitudinal member, a cross member located above and substantially parallel to said longitudinal member, an upright articulated to said longitudinal member and said cross member, and a handlebar upright articulated to said longitudinal member and said cross member and being substantially parallel to said upright;
handlebars connected to said handlebar upright;

a saddle connected to said upright;

a rear wheel rotatably connected to said longitudinal member;

a pedal crank shaft rotatably connected to said longitudinal member and being kinematically connected to said rear wheel;

a front wheel supported on said handlebar upright, and;

releasable telescopic locking means extending diagonally across said articulated parallelogram for locking said articulated parallelogram in a first position, whereat said upright and said handlebar upright are substantially perpendicular to said longitudinal member and said cross member, and a second position, whereat said upright and said handlebar upright are substantially parallel to said longitudinal member and said cross member.

8. Bicycle with folding frame according to claim 7, wherein said releasable telescopic locking means comprise a telescopic locking bar member, and a locking element for locking said telescopic locking bar member at a required length.

9. Bicycle with folding frame according to claim 8, wherein said telescopic locking bar member comprises an outer telescoping element, and an inner telescoping element coupled to said outer telescoping element, and wherein said locking element comprises a locking pin for positionally fixing said outer telescoping element with respect to said inner telescoping element.

10. Bicycle with folding frame according to claim 7, wherein said pedal crank shaft is rotatably supported at a median portion of said longitudinal member, and wherein said longitudinal member has a box-like configuration, means for kinematically connecting said pedal crank shaft to said rear wheel being housed within said longitudinal member.

11. Bicycle with folding frame according to claim 10, wherein said means for kinematically connecting said pedal crank shaft to said rear wheel comprise;

a first crown wheel connected to said pedal crank shaft;

a second crown wheel connected to a first pinion;

a second crown wheel connected to said rear wheel;

first chain means kinematically connecting to said first crown wheel to said second crown wheel, and;

second chain means kinematically connecting said first pinion to said second pinion.

12. Bicycle with folding frame according to claim 7, wherein said front wheel is supported on said handlebar upright by a steering sleeve and a steering shaft, said steering sleeve being supported on said handlebar upright, said steering shaft being supported in said steering sleeve, said front wheel being connected to said steering shaft.

13. Bicycle with folding frame according to claim 7, wherein said handlebars are connected to said handlebar upright by a steering sleeve, a steering shaft, and hinge means, said steering sleeve being supported on said handlebar upright, said steering shaft being supported in said steering sleeve, said hinge means connecting said handlebars to said steering shaft.

14. Bicycle with folding frame according to claim 13, wherein said handlebars are rotatable on said hinge means about an axis which is perpendicular to said steering shaft.

15. Bicycle with folding frame according to claim 13, wherein said handlebars are rotatable on said hinge means about an axis which is perpendicular to said steering shaft.

16. Bicycle with folding frame, wherein said folding frame comprises;

a longitudinal member;

a cross member located above and substantially parallel to said longitudinal member;

an upright articulated to said longitudinal member and to said cross member;

a handlebar upright articulated to said longitudinal member and said cross member and being substantially parallel to said upright;

an articulated parallelogram defined by said longitudinal member, said cross member, said upright and said handlebar upright;

releasable telescopic locking means extending diagonally across said articulated parallelogram for locking said articulated parallelogram in a first position, whereat said upright and said handlebar upright are substantially perpendicular to said longitudinal member and said cross member, and a second position, whereat said upright and said handlebar upright are substantially parallel to said longitudinal member and said cross member.

17. Bicycle with folding frame according to claim 16, wherein said releasable telescopic locking means comprise an outer telescoping element, an inner telescoping element coupled to said outer telescoping element, and locking pin means for positionally fixing said outer telescoping element with respect to said inner telescoping element.

18. Bicycle with folding frame according to claim 16, wherein said longitudinal member has a box-like configuration and rotatably supports a pedal crank shaft and a rear wheel, said pedal crank shaft being rotatably supported at a median portion of said longitudinal member, means for kinematically connecting said pedal crank shaft to said rear wheel being housed within said longitudinal member.

19. Bicycle with folding frame according to claim 18, wherein said means for kinematically connecting said pedal crank shaft to said rear wheel comprise;

a first crown wheel connected to said pedal crank shaft;

a second crown wheel connected to a first pinion;

a second crown wheel connected to said rear wheel;

a first chain means kinematically connecting to said first crown wheel to said second crown wheel, and;

a second chain means kinematically connecting said first pinion to said second pinion.

20. Bicycle with folding frame according to claim 16, further comprising handlebars, said handlebars being connected to said handlebar upright by a steering sleeve, a steering shaft, and hinge means, said steering sleeve being supported on said handlebar upright, said steering shaft being supported in said steering sleeve, said hinge means connecting said handlebars to said steering shaft.

* * * * *